(12) United States Patent
Chang et al.

(10) Patent No.: US 12,345,584 B2
(45) Date of Patent: Jul. 1, 2025

(54) STATIC FORCE RESISTANCE PRESSURE SENSOR

(71) Applicant: AUO Corporation, Hsinchu (TW)

(72) Inventors: Yi-Han Chang, Hsinchu (TW);
Chung-Chin Huang, Hsinchu (TW);
Wen-Yuan Li, Hsinchu (TW);
Wen-Chung Huang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 296 days.

(21) Appl. No.: 18/090,475

(22) Filed: Dec. 28, 2022

(65) Prior Publication Data
US 2024/0210258 A1 Jun. 27, 2024

(30) Foreign Application Priority Data
Dec. 21, 2022 (TW) .................................. 111149091

(51) Int. Cl.
*G01L 1/22* (2006.01)
(52) U.S. Cl.
CPC .................................. *G01L 1/2293* (2013.01)
(58) Field of Classification Search
None
See application file for complete search history.

(56) References Cited

U.S. PATENT DOCUMENTS

| | | | | |
|---|---|---|---|---|
| 10,528,175 | B2* | 1/2020 | Zhai | G06F 3/0418 |
| 10,768,739 | B2* | 9/2020 | Lu | G06F 3/04164 |
| 11,307,699 | B2* | 4/2022 | Kim | G06F 3/045 |
| 2022/0079437 | A1* | 3/2022 | Suzuki | A61B 3/16 |

FOREIGN PATENT DOCUMENTS

| | | |
|---|---|---|
| CN | 103076930 | 5/2013 |
| CN | 216719076 | 6/2022 |

* cited by examiner

*Primary Examiner* — John E Breene
*Assistant Examiner* — Nigel H Plumb
(74) *Attorney, Agent, or Firm* — JCIPRNET

(57) ABSTRACT

A pressure sensor includes a substrate, a pressure sensing element, a first signal line, a second signal line, an elastomer, and an opposite substrate. The pressure sensing element includes first and second resistors connected in series, a third and fourth resistors connected in series, a first switch component, and a second switch component. The first and second resistors are connected in parallel to the third and fourth resistors. The first switch component is electrically connected between the first and second resistors. The second switch component is electrically connected between the third and fourth resistors. The first to fourth resistors at least partially overlap with a cavity of the elastomer, which can increase the stress on the first to fourth resistors when the pressure sensor is under pressure, thereby improving the sensitivity of the pressure sensor.

14 Claims, 12 Drawing Sheets

STATIC FORCE RESISTANCE PRESSURE SENSOR

CROSS-REFERENCE TO RELATED APPLICATION

This application claims the priority benefit of Taiwan application serial no. 111149091, filed on Dec. 21, 2022. The entirety of the above-mentioned patent application is hereby incorporated by reference herein and made a part of this specification.

BACKGROUND

Technical Field

The disclosure is about a pressure sensor.

Description of Related Art

Currently, there are many different types of pressure sensors on the market. For example, common pressure sensors include capacitive pressure sensor, piezoelectric pressure sensor, piezoresistive pressure sensor, etc. Capacitive sensors are easy to couple the touch signal with other signals in the sensor, which makes it difficult to accurately test the small pressure. Piezoelectric sensors sense the pressure by measuring the electric current generated by the change in pressure, so piezoelectric sensors are not capable of measuring static force. Piezoresistive pressure sensors utilize the characteristics of the material for pressure sensing. Generally, piezoresistive pressure sensors are manufactured by forming an integrated circuit on a silicon wafer. However, since silicon wafer is a rigid material, the piezoresistive pressure sensor may only measure forces of a single direction.

SUMMARY

The disclosure provides a pressure sensor that improves the sensitivity of sensing pressure.

At least one embodiment of the disclosure provides a pressure sensor. The pressure sensor includes a substrate, a pressure sensing element, a first signal line, a second signal line, an elastomer, and an opposite substrate. The pressure sensing element is located on the substrate. The pressure sensing element includes a first resistor and a second resistor connected in series, a third resistor and a fourth resistor connected in series, a first switch component, and a second switch component. The first resistor and the second resistor are connected in parallel to the third resistor and the fourth resistor. The first switch component is electrically connected between the first resistor and the second resistor. The second switch component is electrically connected between the third resistor and the fourth resistor. The first signal line is electrically connected between the first resistor and the fourth resistor. The second signal line is electrically connected between the second resistor and the third resistor. The elastomer is located on the substrate and includes a cavity. The first resistor, the second resistor, the third resistor, and the fourth resistor at least partially overlap with the cavity. The opposite substrate is located on the elastomer.

Based on the above, the sensitivity of sensing pressure is improved by disposing the elastomer and the cavity.

DESCRIPTION OF THE EMBODIMENTS

Figure 1A:
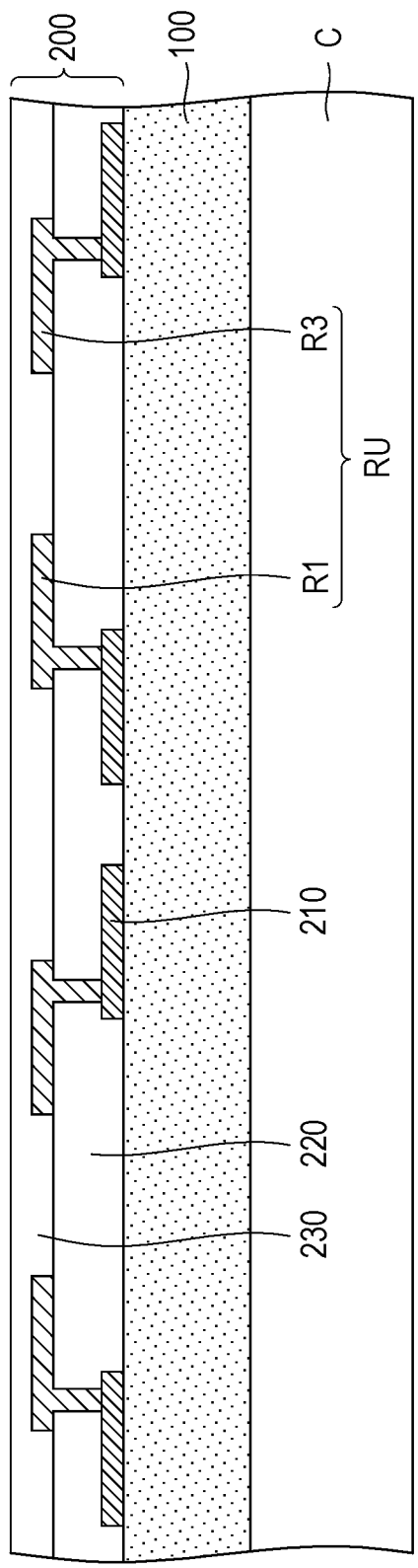
FIG. 1A to FIG. 1C are cross-sectional schematic views of a manufacturing method of a pressure sensor according to an embodiment of the disclosure.
Figure 1B:
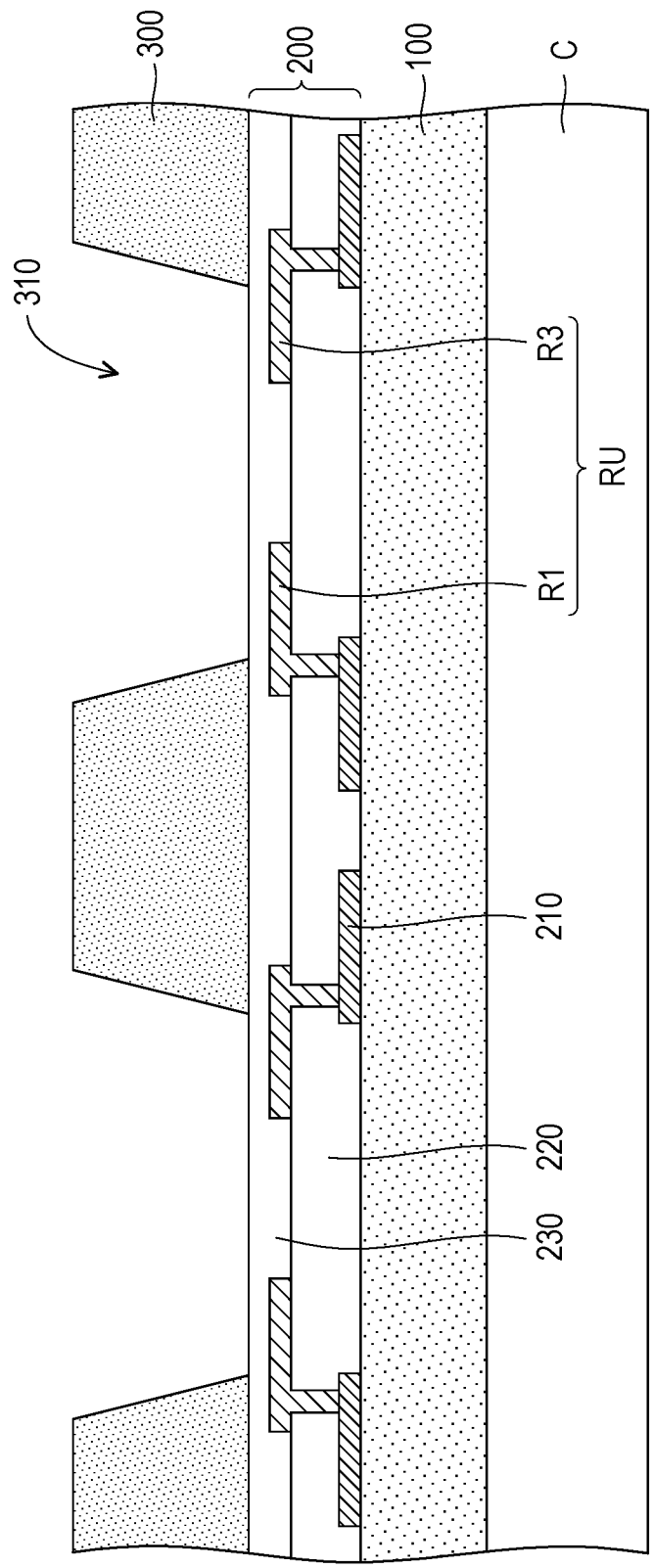
Figure 1C:
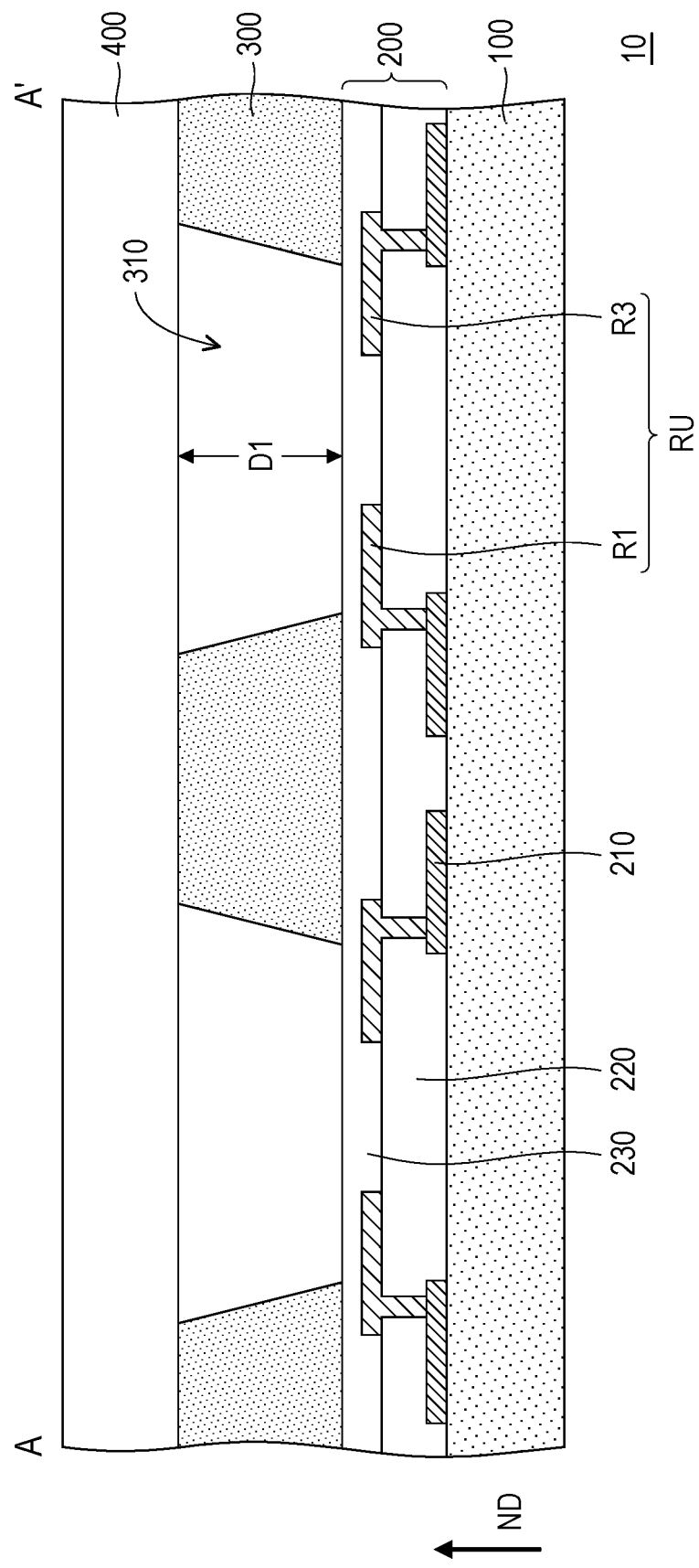

FIG. 1A to FIG. 1C are cross-sectional schematic views of a manufacturing method of a pressure sensor 10 according to an embodiment of the disclosure. First, referring to FIG. 1A, a substrate 100 is formed on a carrier C. Methods for forming the substrate 100 include attaching or coating. In some embodiments, the carrier C includes a rigid substrate and the material of the carrier C includes, for example, glass, quartz, acrylic, silicon wafer, or other materials suitable for carrying the substrate 100. The substrate 100 is, for example, a flexible substrate or a stretchable substrate. For example, materials of the flexible substrate and the stretchable substrate include polyimide (PI), polydimethylsiloxane (PDMS), polyethylene terephthalate (PET), polyethylene naphthalate (PEN), polyester (PES), polymethylmethacrylate (PMMA), polycarbonate (PC), polyurethane (PU), fiber-reinforced plastic (FRP), or other suitable materials. In some embodiments, the thickness of substrate 100 is 1 micrometer to 50 micrometers.

Figure 2:
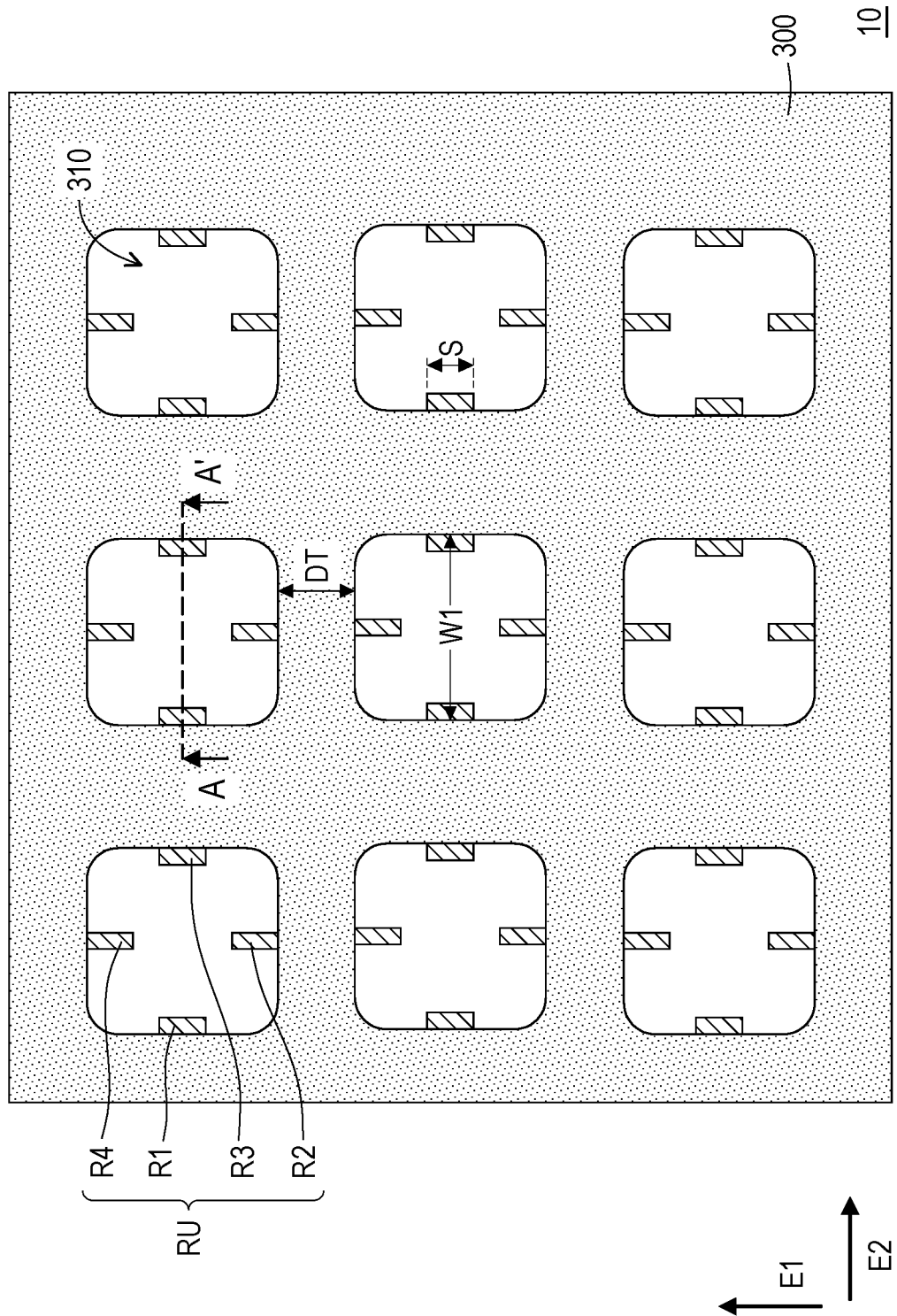
FIG. 2 is a schematic top view of the pressure sensor in FIG. 1C.

A circuit structure 200 is formed on the substrate 100. In this embodiment, the circuit structure 200 includes a conducting wire 210, a first insulating layer 220, multiple resistors (including a first resistor R1, a second resistor R2 (as shown in FIG. 2), a third resistor R3 and a fourth resistor R4 (as shown in FIG. 2)), and a second insulating layer 230. The conducting wire 210 is formed on the substrate 100. The first insulating layer 220 is formed on the substrate 100 and covers the conducting wire 210. The resistors are formed on the first insulating layer 220 and is electrically connected to the conducting wire 210. For example, some resistors are electrically connected to the conducting wire 210 through a conducting hole. The second insulating layer 230 is formed on the first insulating layer 220 and covers the resistors.

In this embodiment, the conducting wire 210, the first insulating layer 220, the resistors, and the second insulating layer 230 are sequentially formed, but the disclosure is not limited thereto. In other embodiments, the forming sequence of the conducting wire 210, the first insulating layer 220, the resistors, and the second insulating layer 230 is adjusted according to requirements.

In some embodiments, the materials of the first resistor R1, the second resistor R2 (as shown in FIG. 2), the third resistor R3, and the fourth resistor R4 (as shown in FIG. 2) are metal material, semiconductor material, or other suitable materials. Semiconductor material includes, for example, polycrystalline silicon, metal oxide semiconductor, or other materials, and polycrystalline silicon includes, for example, micro-crystalline silicon or nano-crystalline silicon. In some embodiments, respective materials of the first insulating layer 220 and the second insulating layer 230 are organic materials or inorganic materials. In some embodiments, the material of the conducting wire 210 is metal material, semiconductor material, or other suitable materials.

In some embodiments, the circuit structure 200 may also include more insulating layers, more conducting wires, multiple active components (not shown), and/or multiple passive components (not shown), the active component (not shown) is a switch component or other type of active component. The switch component is, for example, a thin film transistor.

In this embodiment, the circuit structure 200 includes multiple pressure sensing elements RU. The pressure sensing elements RU are located on the substrate 100, and each of the pressure sensing elements RU includes the first resistor R1, the second resistor R2 (as shown in FIG. 2), the third resistor R3, and the fourth resistor R4 (as shown in FIG. 2).

Next, referring to FIG. 1B, an elastomer 300 is formed on the substrate 100. In this embodiment, the elastomer 300 is formed on the circuit structure 200. In some embodiments, the material of the elastomer 300 is organic material or inorganic material.

The elastomer 300 includes multiple cavities 310. In some embodiments, the elastomer 300 includes a photosensitive material, and the method for forming the elastomer 300 includes a coating process, an exposure and development process, and other suitable processes, but the disclosure is not limited thereto. In other embodiments, the elastomer 300 includes inorganic material, and the method of forming the elastomer 300 includes coating process, etching process, and other suitable processes. In other words, the cavities 310 of the elastomer 300 are formed through the exposure and development process and/or the etching process.

In this embodiment, the side walls of the cavities 310 are slope-typed, but the disclosure is not limited thereto. In other embodiments, the types of the side walls of the cavities 310 include step type or vertical type (the side wall is perpendicular to the circuit structure 200).

FIG. 2 is a schematic top view of the pressure sensor 10 according to an embodiment of the disclosure. FIG. 1C is a schematic cross-sectional view taken along the line A-A' of FIG. 2. Continuing from FIG. 1B, referring to FIG. 1C and FIG. 2, an opposite substrate 400 is attached to the elastomer 300 by using glue, vacuum attachment, or atmospheric bonding/bonding. In some embodiments, the carrier C is removed before or after attaching the opposite substrate 400 to the elastomer 300. In some embodiments, before or after removing the carrier C, the whole lamination structure is cut to obtain the pressure sensor 10 of proper size. In some embodiments, the opposite substrate 400 has an adhesive layer (not shown) on at least one side.

In some embodiments, the opposite substrate 400 is a rigid substrate, such as glass fiber, metal, ceramic, organic material, or other hard material, but the disclosure is not limited thereto. In other embodiments, the opposite substrate 400 is, for example, a flexible substrate or a stretchable substrate. For example, materials of the flexible substrate and the stretchable substrate include polyimide (PI), polydimethylsiloxane (PDMS), polyethylene terephthalate (PET), polyethylene naphthalate (PEN), polyester (PES), polymethylmethacrylate (PMMA), polycarbonate (PC), polyurethane (PU), fiber-reinforced plastic (FRP), or other suitable materials. In some embodiments, the hardness of the opposite substrate 400 is greater than the hardness of the substrate 100; or the hardness of the opposite substrate 400 is the same as the hardness of the substrate 100, but the thickness of the opposite substrate 400 is greater than or equal to the thickness of the substrate 100. In some embodiments, in addition to attaching the opposite substrate 400 to the elastomer 300, other soft films (not shown) is attached to the back of the substrate 100 by glue, vacuum attachment, or bonding.

After providing the opposite substrate 400 on the elastomer 300, a flexible printed circuit board (not shown) is bonded to the pressure sensor 10, and through the flexible printed circuit board, a system circuit board (not shown) or a chip (not shown) is electrically connected to the pressure sensing element RU of the pressure sensor 10, and then pressure detection is performed.

The pressure sensing element RU includes the first resistor R1, the second resistor R2, the third resistor R3, and the fourth resistor R4. In this embodiment, multiple pressure sensing elements RU are arranged in an array along a first direction E1 and a second direction E2 perpendicular to the first direction E1, thereby obtaining a pressure sensor 10 with high resolution.

In this embodiment, on a normal direction ND of the surface of the substrate 100, each of the cavities 310 overlaps with a corresponding pressure sensing element RU. Each of the first resistor R1, the second resistor R2, the third resistor R3, and the fourth resistor R4 of each of the pressure sensing elements RU at least partially overlaps with a corresponding cavity 310. In this embodiment, each of the first resistor R1, the second resistor R2, the third resistor R3, and the fourth resistor R4 does not partially overlap with the corresponding cavity 310. In other words, in the top view, each of the first resistor R1, the second resistor R2, the third resistor R3, and the fourth resistor R4 extends from outside of the corresponding cavity 310 into inside of the corresponding cavity 310, and partially overlap with the edge of the corresponding cavity 310.

In this embodiment, an insulating layer (second insulating layer 230) is provided between each of the first resistor R1, the second resistor R2, the third resistor R3, and the fourth resistor R4 and the cavity 310. In other words, in this embodiment, the first resistor R1, the second resistor R2, the third resistor R3, and the fourth resistor R4 are disposed outside the cavity 310. In other embodiments, the second insulating layer 230 or at least one of the first resistor R1, the second resistor R2, the third resistor R3, and the fourth resistor R4 forming on the second insulating layer 230 are omitted, so that at least a part of the first resistor R1, the second resistor R2, the third resistor R3, and the fourth resistor R4 are located inside the cavity 310. In some embodiments, the elastomer 300 is directly formed on the first resistor R1, the second resistor R2, the third resistor R3, the fourth resistor R4, and the first insulating layer 220.

In some embodiments, respective sizes S of the first resistor R1, the second resistor R2, the third resistor R3, and the fourth resistor R4 is 1 micrometer to 250 micrometers. In some embodiments, each of the first resistor R1, the second resistor R2, the third resistor R3, and the fourth resistor R4 overlaps with the edge of the cavity 310 by a length of 0 to 30 micrometers. In other embodiments, the first resistor R1, the second resistor R2, the third resistor R3, and the fourth resistor R4 are formed outside the cavity 310, and a horizontal distance from the edge of the cavity 310 is 3 micrometers to 100 micrometers.

In some embodiments, a width W1 of each of the cavities 310 is 300 micrometers to 1000 micrometers. In some embodiments, distances DT between the cavities 310 is 50 micrometers to 300 micrometers. In some embodiments, centers of the cavity 310 have a pitch of 10 micrometers to 2000 micrometers from each other. In some embodiments, a depth D1 of each of the cavities 310 is 2 micrometers to 50 micrometers.

In some embodiments, the first resistor R1, the second resistor R2, the third resistor R3, and the fourth resistor R4 are disposed corresponding to four side surfaces of the cavity 310 respectively. The edge of the cavity 310 tends to generate greater stress in response to the pressure sensor 10 being stressed. Thus, disposing the first resistor R1, the second resistor R2, the third resistor R3, and the fourth resistor R4 to overlap with the edge of the cavity 310 increases the sensitivity of the pressure sensor 10. In this embodiment, the first resistor R1, the second resistor R2, the third resistor R3, and the fourth resistor R4 are respectively disposed inside the four side surfaces of the cavity 310, and have a partial overlaying area with the edge of the cavity 310. In some embodiments, the pressure sensor 10 is flexible or stretchable, and is adapted to measure the normal force, lateral force, and/or bending force exerted on the pressure sensor 10. In addition, in some embodiments, both the front and the back of the pressure sensor 10 are capable of measuring the pressure. In addition, compared to measuring the pressure by detecting the change in capacitance, this embodiment measures the pressure by detecting the change in resistivity, which is less likely to cause inaccurate measurement results due to apparatus degradation or signal coupling.

Figure 3:
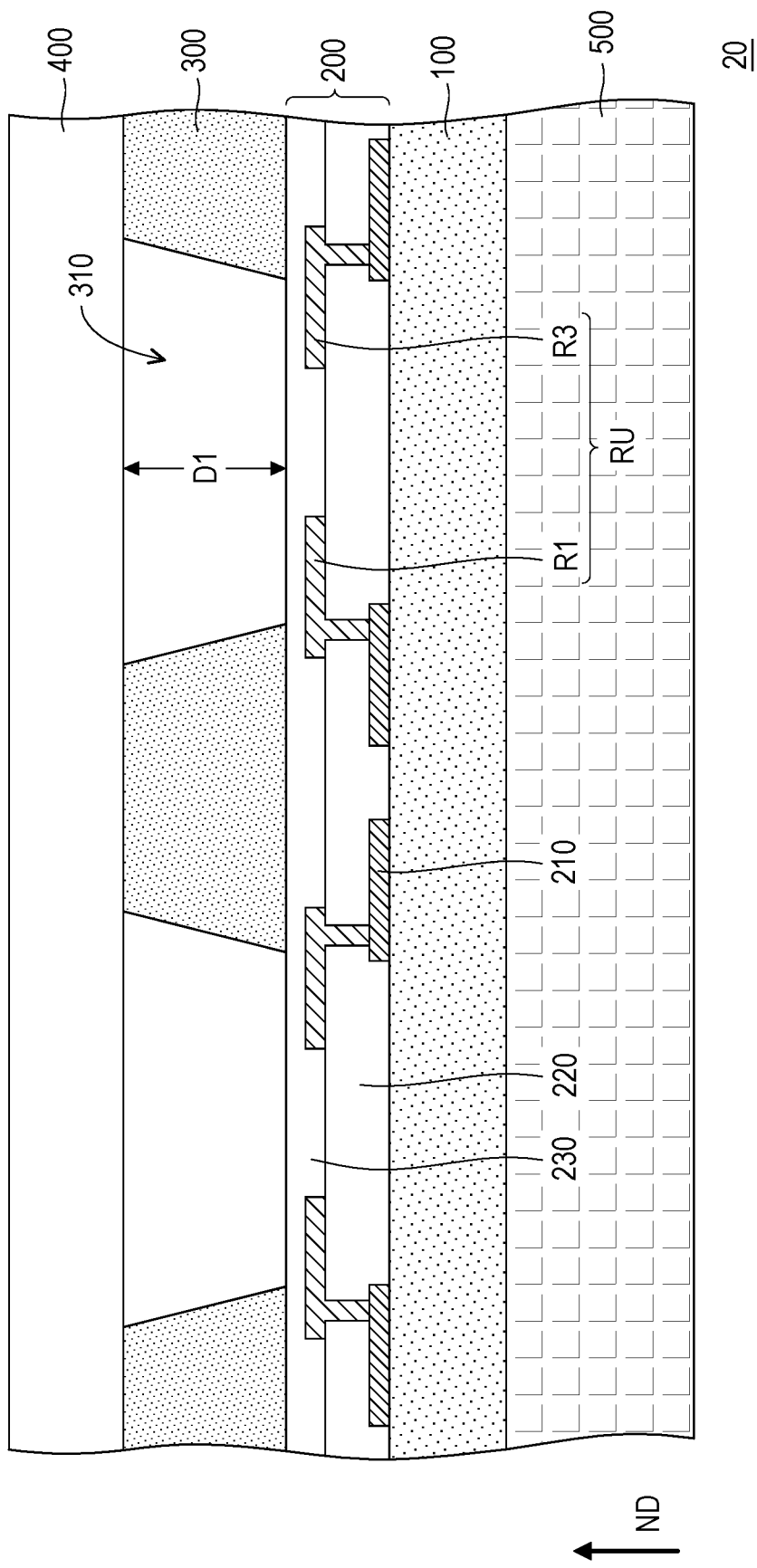
FIG. 3 is a cross-sectional schematic view of a pressure sensor according to an embodiment of the disclosure.

FIG. 3 is a cross-sectional schematic view of a pressure sensor according to an embodiment of the disclosure. It is noted here that the embodiment of FIG. 3 uses the reference numerals and a part of the contents of the embodiment of FIG. 1A to FIG. 2, and the same or similar reference numerals are used to denote the same or similar elements, and the description of the same technical content is omitted. For the description of the omitted part, reference may be made to the foregoing embodiment, and details are not described herein.

The main difference between the pressure sensor 20 in FIG. 3 and the pressure sensor 10 in FIG. 1C is that the pressure sensor 20 further includes a soft film 500. The soft film 500 is located at the back of the substrate 100. The substrate 100 is located between the pressure sensing element RU and the soft film 500.

The soft film 500 is pasted on the substrate 100 by glue, vacuum attachment, or bonding. In some embodiments, materials of the soft film 500 include polyimide (PI), polydimethylsiloxane (PDMS), polyethylene terephthalate (PET), polyethylene naphthalate (PEN), polyester (PES), polymethylmethacrylate (PMMA), polycarbonate (PC), polyurethane (PU), fiber-reinforced plastic (FRP), or other suitable materials. By pasting the soft film 500 on the back of substrate 100, the sensitivity and accuracy of the pressure sensor 20 is adjusted. In some embodiments, the soft film 500 has an adhesive layer (not shown) on at least one surface.

Table 1 provides the hardness of the soft film 500 of different materials and the sensitivity and accuracy of the pressure sensor 20 including the soft film 500 of different materials. In Table 1, the material of the substrate 100 of the pressure sensor 20 is polyimide, and the material of the opposite substrate 400 is polyethylene terephthalate.

TABLE 1

| Material of soft film | Hardness of soft film | Sensitivity (mV/V/kPa) | Accuracy (mg/cm$^2$) |
|---|---|---|---|
| no soft film | NA | $7.5 \times 10^2$ | 0.3 |
| PU | <Shore hardness 30 A | $7.6 \times 10^2$ | 0.3 |
| PDMS | Shore hardness 30 A | $7.0 \times 10^2$ | 0.4 |
| PET | >Shore hardness 70 A | $2.6 \times 10^2$ | 1.0 |

Table 1 shows that in the case that the material of the soft film 500 is PU, the sensitivity of the pressure sensor 20 is higher, and in the case that the material of the soft film 500 is PET, the accuracy of the pressure sensor 20 is higher. Thus, the pressure sensor 20 with different sensitivity is obtained by replacing different soft films 500.

Table 2 provides the amount of deformation of the soft film 500 of different materials subjected to the same pressure at different thicknesses. In Table 2, the pressure applied to the soft film 500 is 40k Pa.

TABLE 2

| Material of soft film | Thickness of soft film (micrometer) | Deformation amount of soft film (%) |
|---|---|---|
| PDMS | 250 | 0.035 |
|  | 500 | 0.025 |
|  | 750 | 0.017 |
| PET | 20 | 0.011 |
|  | 40 | 0.0062 |

Table 2 shows that the thickness of the soft film 500 is related to the amount of deformation of the soft film 500 after being compressed. Thus, the pressure sensor 20 with different characteristics is obtained by adjusting the thickness of the soft film 500.

Figure 4:
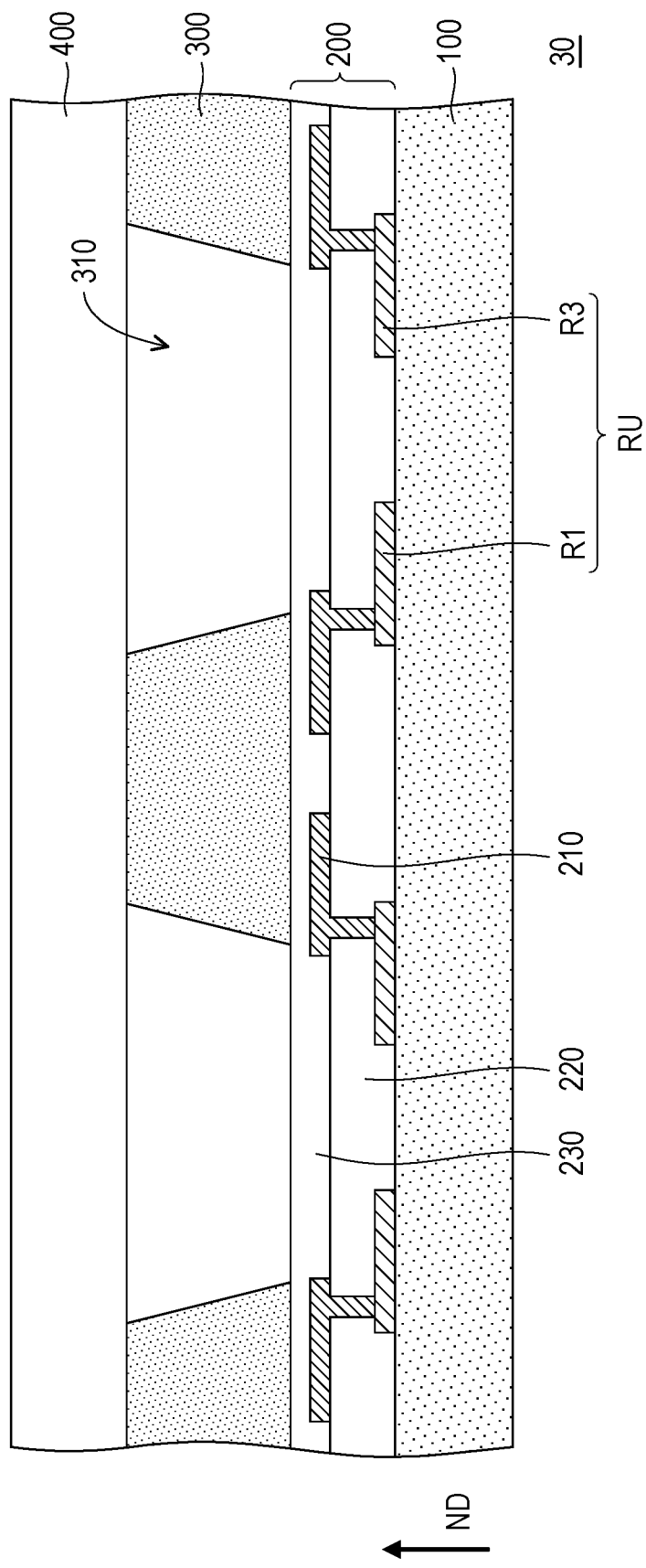
FIG. 4 is a cross-sectional schematic view of a pressure sensor according to an embodiment of the disclosure.

FIG. 4 is a cross-sectional schematic view of a pressure sensor 30 according to an embodiment of the disclosure. It is noted here that the embodiment of FIG. 4 uses the reference numerals and a part of the contents of the embodiment of FIG. 1A to FIG. 2, and the same or similar reference numerals are used to denote the same or similar elements, and the description of the same technical content is omitted. For the description of the omitted part, reference may be made to the foregoing embodiment, and details are not described herein.

The main difference between the pressure sensor 30 in FIG. 3 and the pressure sensor 10 in FIG. 1C is that in the circuit structure 200 of the pressure sensor 10, the conducting wire 210 is formed first and then the resistor in the pressure sensing element RU is formed, while in the circuit structure 200 of the pressure sensor 30, the resistor in the pressure sensing element RU is formed first, and then the conducting wire 210 is formed.

Referring to FIG. 4, in this embodiment, the resistor in the pressure sensing element RU is formed on the substrate 100.

Figure 5:
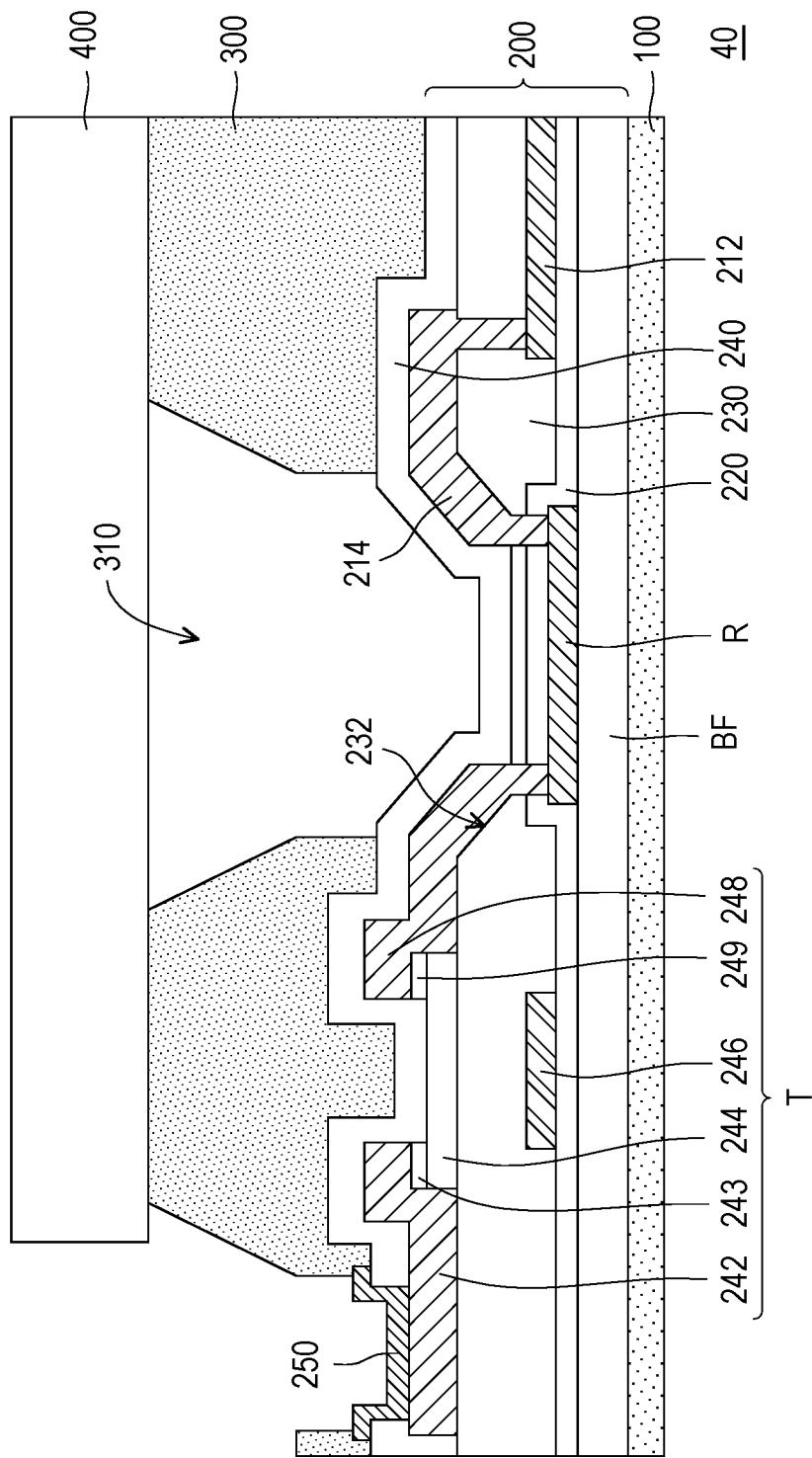
FIG. 5 is a cross-sectional schematic view of a pressure sensor according to an embodiment of the disclosure.

FIG. 5 is a cross-sectional schematic view of a pressure sensor 40 according to an embodiment of the disclosure. It is noted here that the embodiment of FIG. 5 uses the reference numerals and a part of the contents of the embodiment of FIG. 1A to FIG. 2, and the same or similar reference numerals are used to denote the same or similar elements, and the description of the same technical content is omitted. For the description of the omitted part, reference may be made to the foregoing embodiment, and details are not described herein.

Referring to FIG. 5, in this embodiment, the circuit structure 200 is located on the substrate 100 and includes a buffer layer BF, multiple resistors R, a conducting wire 212, a conducting wire 214, a first insulating layer 220, a second insulating layer 230, a third insulating layer 240, a pad 250, and a switch component T. The switch component T includes a gate 246, a semiconductor channel 244, a first source/drain 242, a second source/drain 248, a first ohmic contact layer 243, and a second ohmic contact layer 249.

The buffer layer BF is located on the substrate 100 and includes a monolayer or multilayer structure. The resistors R are located on the buffer layer BF. The first insulating layer 220 is located on the buffer layer BF and the resistors R. The gate 246 and the conducting wire 212 are located on the first insulating layer 220. The second insulating layer 230 is located on the first insulating layer 220, the gate 246, and the conducting wire 212. The semiconductor channel 244 is located on the second insulating layer 230 and overlaps with the gate 246. The first source/drain 242, the second source/drain 248, and the conducting wire 214 are located on the second insulating layer 230. The first source/drain 242 and the second source/drain 248 are electrically connected to the semiconductor channel 244. The first ohmic contact layer 243 is located between the first source/drain 242 and the semiconductor channel 244, and the second ohmic contact layer 249 is located between the second source/drain 248 and the semiconductor channel 244. The second source/drain 248 and the conducting wire 214 are electrically connected to the resistors R through a conducting hole, and the conducting wire 214 is electrically connected to the conducting wire 212 through the conducting hole. The third insulating layer 240 is located on the first source/drain 242, the second source/drain 248, and the conducting wire 214. The pad 250 is electrically connected to the first source/drain 242. In some embodiments, an external flexible printed circuit board is electrically connected to the switch component T and the resistors R through the pad 250.

In some embodiments, after forming the first insulating layer 220, the resistivity of the resistors R is adjusted by ion doping, but the disclosure is not limited thereto. In some embodiments, the resistors R include metal oxide, and the second insulating layer 230 includes hydrogen atoms. After forming the second insulating layer 230, heat treatment is performed to diffuse the hydrogen atoms into the resistors R, thereby adjusting the resistance of the resistors R. In addition, changing the gas type, gas flow rate, gas ratio, or other parameters used to form the resistors R may also adjust the resistance of the resistors R.

In some embodiments, the material of the semiconductor channel 244 includes, for example, amorphous silicon, indium gallium zinc oxide, polycrystalline silicon, or other suitable materials. In some embodiments, the semiconductor channel 244 and the resistors R may include the same material.

In addition, in this embodiment, after a patterning process, the second insulating layer 230 has a groove 232 overlapping the cavity 310. With the design of the groove 232, the strain of the resistors R and the sensitivity of the Wheatstone bridge are increased in response to subjecting the pressure sensor 40 to pressure. In other embodiments, the aforementioned patterning process may pattern the first insulating layer 220 together, so that the groove 232 extends into the first insulating layer 220. In other embodiments, the manufacturing process of the groove 232 may be omitted by choosing not to perform the aforementioned patterning process.

In this embodiment, the second source/drain 248 and the conducting wire 214 are electrically connected to the resistors R through two conducting holes passing through the first insulating layer 220 and the second insulating layer 230, but the disclosure is not limited thereto. In other embodiments, the groove 232 formed by the aforementioned patterning process directly extends to the surface of the resistor R, and the second source/drain 248 and the conducting wire 214 contact the resistors R through the same groove 232.

In this embodiment, a single resistor R has a continuous structure, but the disclosure is not limited thereto. In other embodiments, a single resistor R is formed by connecting multiple resistor materials in series through conducting wires. The length and the width of each of the resistor materials are 1 micrometer to 200 micrometers. In some embodiments, in response to a single resistor R being formed by connecting the resistor materials in series, the resistor materials are arranged along the edge of the cavity 310.

The elastomer 300 is located on the third insulating layer 240 and has multiple cavities 310. The elastomer 300 exposes the pad 250. In this embodiment, the resistors R at least partially overlap with the cavity 310. In this embodiment, the first insulating layer 220, the second insulating layer 230, and the third insulating layer 240 are provided between the resistors R and the cavity 310, but the disclosure is not limited thereto. In other embodiments, the resistors R are located between the first insulating layer 220 and the second insulating layer 230, between the second insulating layer 230 and the third insulating layer 240, or on the third insulating layer 240.

In some embodiments, the gate 246 and the conducting wire 212 belong to the same film layer. In some embodiments, the first source/drain 242, the second source/drain 248, and the conducting wire 214 belong to the same film layer.

In this embodiment, the switch component T is a bottom gate type thin film transistor, but the disclosure is not limited thereto. In other embodiments, the switch component T is a top gate type thin film transistor, a double gate type thin film transistor, or other forms of thin film transistors. In addition, in some embodiments, the structure of the switch component T is adjusted (e.g., changing the switch component T to a top gate type thin film transistor), so that the semiconductor channel 244 and the resistors R may be formed through the same process.

Figure 6:
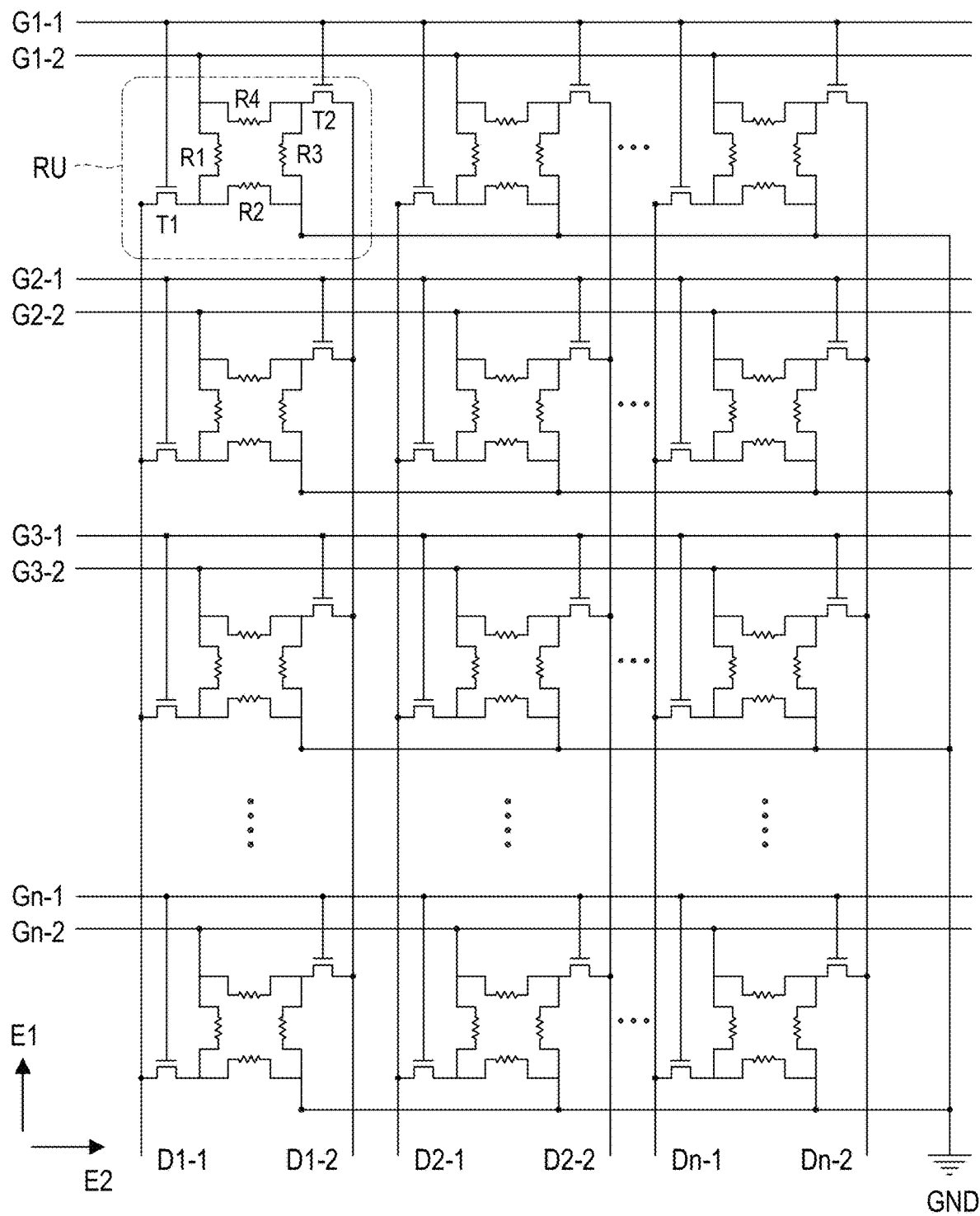
FIG. 6 is a schematic view of a circuit of a pressure sensor according to an embodiment of the disclosure.

FIG. 6 is a schematic view of a circuit of a pressure sensor according to an embodiment of the disclosure. It is noted here that the embodiment of FIG. 6 uses the reference numerals and a part of the contents of the embodiment of FIG. 5, and the same or similar reference numerals are used to denote the same or similar elements, and the description of the same technical content is omitted. For the description of the omitted part, reference may be made to the foregoing embodiment, and details are not described herein.

FIG. 6 illustrates the circuit layout of the circuit structure 200 (as shown in FIG. 5) of the pressure sensor 40. Referring to FIG. 6, the pressure sensing elements RU are arranged in an array along the first direction E1 and the second direction E2, each of the pressure sensing elements RU includes a first resistor R1, a second resistor R2, a third resistor R3, a fourth resistor R4, a first switch component T1, and a second switch component T2.

Multiple gate signal lines G1-1~Gn-1 and multiple first signal lines G1-2~Gn-2 are respectively electrically connected to a corresponding pressure sensing element RU. For example, the first row of the pressure sensing elements RU is electrically connected to the gate signal line G1-1 and the first signal line G1-2; the second row of the pressure sensing elements RU is electrically connected to the gate signal line G2-1 and the first signal line G2-2; the nth row of pressure sensing elements RU is electrically connected to the gate signal line Gn-1 and the first signal line Gn-2.

Each of the pressure sensing elements RU includes the first resistor R1 and the second resistor R2 connected in series and the third resistor R3 and the fourth resistor R4 connected in series. The first resistor R1 and the second resistor R2 are connected in parallel to the third resistor R3 and the fourth resistor R4 to form a Wheatstone bridge.

The gate signal lines G1-1~Gn-1 are electrically connected to the gate of the first switch component T1 and the gate of the second switch component T2. The first signal lines G1-2~Gn-2 are electrically connected between the first resistor R1 and the fourth resistor R4. A second signal line GND is electrically connected between the second resistor R2 and the third resistor R3. The second signal line GND is, for example, connected to the grounding voltage.

In this embodiment, the gates of the first switch components T1 and the gates of the second switch components T2 of the pressure sensing elements RU in the same row in the second direction E2 are electrically connected to a corresponding gate signal line G1-1~Gn-1. In this embodiment, the pressure sensing elements RU in the same row in the second direction E2 are electrically connected to a corresponding first signal line G1-2~Gn-2. For example, the first row of the pressure sensing elements RU is electrically connected to the gate signal line G1-1 and the first signal line G1-2, the second row of the pressure sensing elements RU is electrically connected to the gate signal line G2-1 and the first signal line G2-2, and the nth row of pressure sensing elements RU is electrically connected to the gate signal line Gn-1 and the first signal line Gn-2.

The first source/drain of the first switch component T1 is electrically connected between the first resistor R1 and the second resistor R2. The first source/drain of the second switch component T2 is electrically connected between the third resistor R3 and the fourth resistor R4. The second source/drain of the first switch component T1 is electrically connected to first signal sensing lines D1-1~Dn-1. The second source/drain of the second switch component T2 is electrically connected to second signal sensing lines D1-2~Dn-2. In other words, the first signal sensing lines D1-1~Dn-1 are electrically connected to the first resistor R1 and the second resistor R2 of the corresponding pressure sensing element RU through the first switch component T1, and the second signal sensing lines D1-2~Dn-2 are electrically connected to the third resistor R3 and the fourth resistor R4 of the corresponding pressure sensing element RU through the second switch component T2.

In this embodiment, the first switch components T1 of the pressure sensing elements RU in the same column in the first direction E1 are electrically connected to a corresponding first signal sensing line D1-1~Dn-1, and the second switch components T2 of the pressure sensing elements RU in the same column in the first direction E1 are electrically connected to a corresponding second signal sensing line D1-2~Dn-2. For example, the first switch components T1 and the second switch components T2 of the pressure sensing elements RU on the first column are electrically connected to the first signal sensing line D1-1 and the second signal sensing line D1-2, respectively. The first switch components T1 and the second switch components T2 of the pressure sensing elements RU on the second column are electrically connected to the first signal sensing line D2-1 and the second signal sensing line D2-2, respectively. The first switch components T1 and the second switch components T2 of the pressure sensing elements RU on the nth column are electrically connected to the first signal sensing line Dn-1 and the second signal sensing line Dn-2, respectively.

Figure 7:
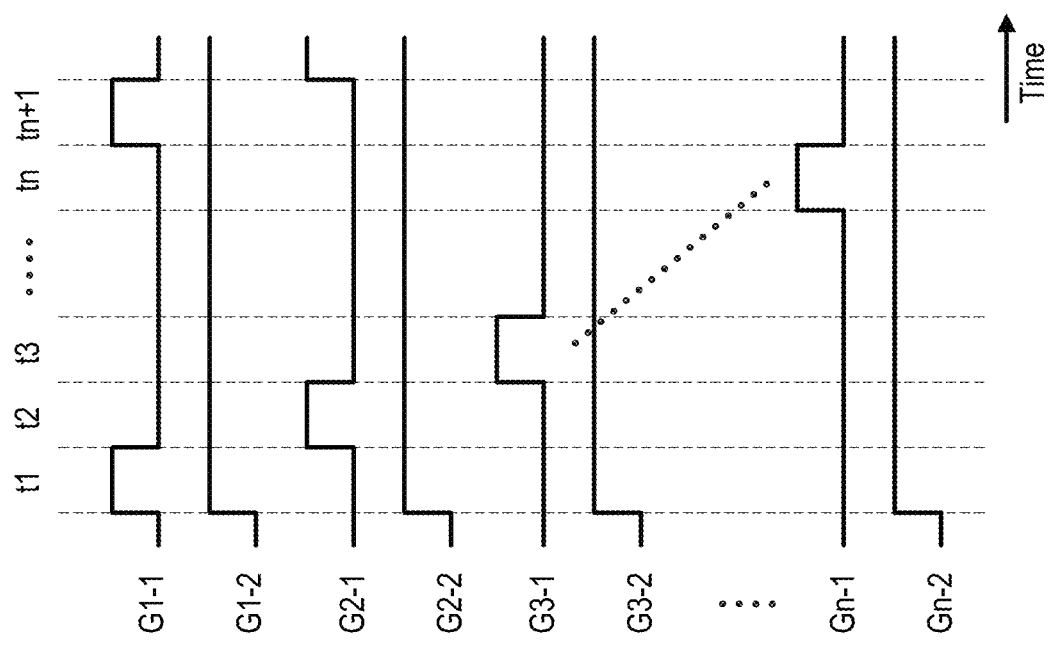
FIG. 7 is a signal waveform diagram of the pressure sensor in FIG. 6.

FIG. 7 is a signal waveform diagram of the pressure sensor in FIG. 6. Referring to FIG. 7, during pressure sensing, voltage is applied to the first signal lines G1-2~Gn-2, so that a voltage difference is provided between the first signal lines G1-2~Gn-2 and the second signal line GND. In some embodiments, a fixed voltage of direct current is applied to the first signal lines G1-2~Gn-2.

Next, the gate signal lines G1-1~Gn-1 are scanned in sequence. For example, n gate signal lines G1-1~Gn-1 are provided in total. Thus, each cycle of the scanning includes a first scanning time t1 to a nth scanning time tn.

At the first scanning time t1, the gate signal line G1-1 is opened, and other gate signal lines are closed; at the second scanning time t2, the gate signal line G2-1 is opened, and other gate signal lines are closed; at the third scanning time t3, the gate signal line G3-1 is opened, and other gate signal lines are closed; at the n scanning time tn, the gate signal line Gn-1 is opened, and other gate signal lines are closed. After completing a scanning cycle, scanning is restarted from the gate signal line G1-1. For example, at the n+1 scanning time tn+1, the gate signal line G1-1 is re-opened, and other gate signal lines are closed.

During pressure sensing, the voltage difference between the first signal sensing lines D1-1~Dn-1 and the second signal sensing lines D1-2~Dn-2 is detected, and the pressure on the corresponding pressure sensing element RU is calculated by a system circuit board (not shown) or a chip (not shown).

Figure 8:
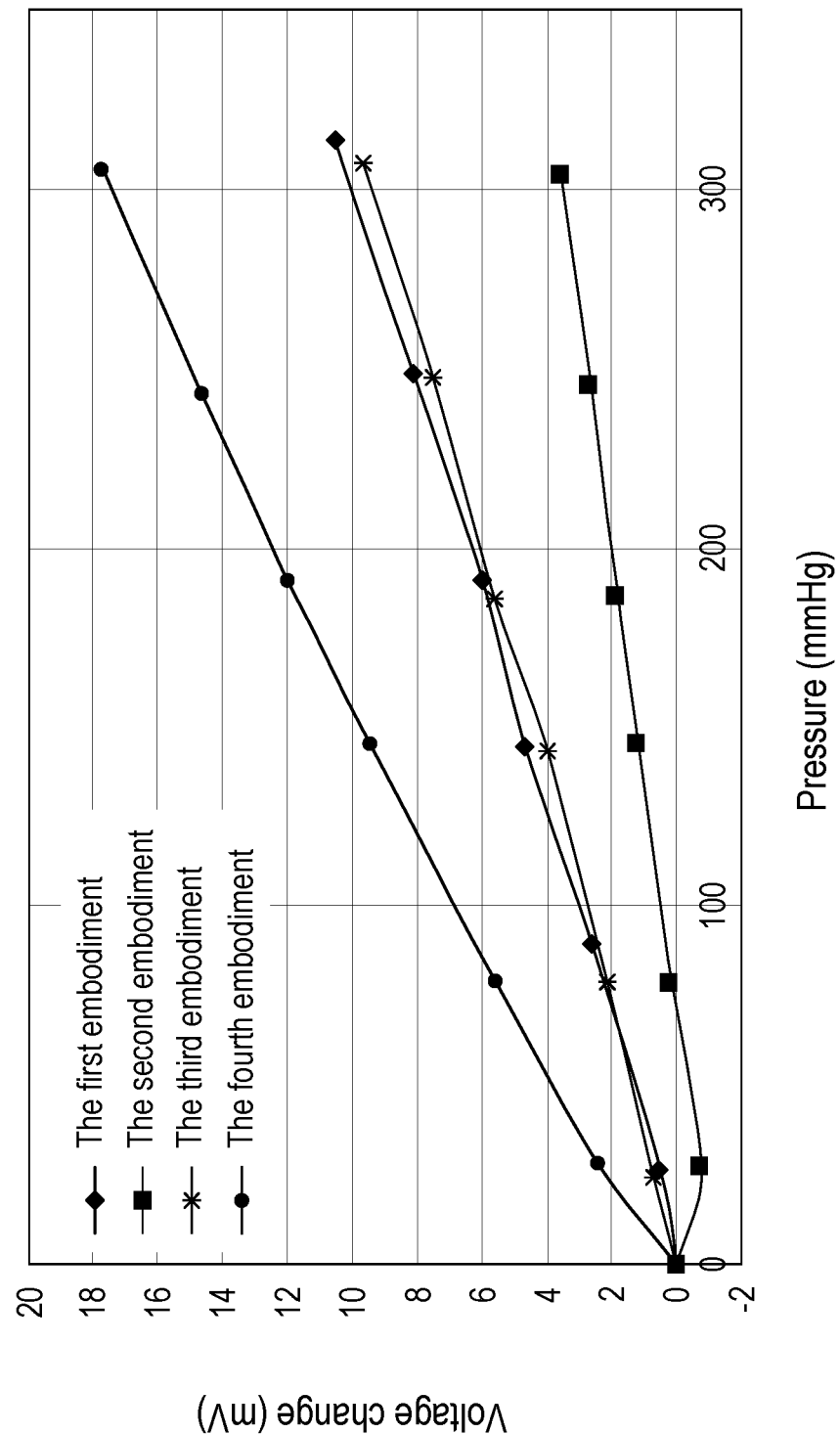
FIG. 8 is a line chart showing voltage change and the pressure of pressure sensors according to some embodiments of the disclosure.

FIG. 8 is a line chart showing voltage change and the pressure of pressure sensors according to some embodiments of the disclosure. The voltage change is measured through the first signal sensing lines D1-1~Dn-1 and the second signal sensing lines D1-2~Dn-2 shown in FIG. 6 and FIG. 7. In this embodiment, a voltage of 3.36V is applied to the first signal lines G1-2~Gn-2, and the second signal line GND is grounded.

In FIG. 8, the pressure sensor of the first embodiment to the third embodiment has a similar structure, the difference is that the pressure sensor of the first embodiment does not have a soft film (the structure of the pressure sensor of the first embodiment is shown in FIG. 1C), and the pressure sensor of the second embodiment and the third embodiment have soft films of different materials (the structure of the pressure sensors of the second embodiment to the third embodiment is shown in FIG. 3).

In the pressure sensor of the first embodiment to the fourth embodiment, the material of the substrate 100 is all PI, and the material of the opposite substrate 400 is all PET. The first embodiment does not have a soft film. The material of the soft film of the second embodiment is PET. The material of the soft films of the third embodiment and fourth embodiment is PDMS.

In addition, the pressure sensor of the third embodiment and the pressure sensor of the fourth embodiment have the soft film of the same material. However, the width of the cavity of the elastomer of the pressure sensor of the fourth embodiment is greater than the width of the cavity of the elastomer of the pressure sensor of the third embodiment. In FIG. 8, the width W1 of the cavities of the elastomers from the first embodiment to the third embodiment (as shown in FIG. 2) is 500 micrometers. The cavity width W1 of the pressure sensor of the fourth embodiment is 800 micrometers.

Table 3 shows the voltage change and the pressure of the pressure sensors from the first embodiment to the fourth embodiment.

TABLE 3

| The first embodiment | | The second embodiment | | The third embodiment | | The fourth embodiment | |
| --- | --- | --- | --- | --- | --- | --- | --- |
| Pressure (mmHg)) | Voltage change (mV)) | Pressure (mmHg)) | Voltage change (mV)) | Pressure (mmHg)) | Voltage change (mV)) | Pressure (mmHg)) | Voltage change (mV)) |
| 26.33 | 0.52 | 27.66 | −0.73 | 23.98 | 0.7 | 28.32 | 2.45 |
| 89.37 | 2.61 | 78.93 | 0.17 | 78.78 | 2.15 | 79.44 | 5.65 |
| 144.54 | 4.67 | 145.79 | 1.2 | 143.43 | 4 | 145.64 | 9.49 |
| 190.88 | 5.97 | 186.98 | 1.82 | 185.73 | 5.6 | 190.88 | 11.98 |
| 248.62 | 8.1 | 246.04 | 2.65 | 247.52 | 7.51 | 243.47 | 14.68 |
| 313.72 | 10.53 | 304.52 | 3.53 | 307.28 | 9.67 | 305.99 | 17.72 |

FIG. 8 and Table 3 show that the voltage change measured by the pressure sensor of the second embodiment first decreases and then increases as the pressure increases. This is because the pressure sensor of the second embodiment uses PET as the soft film, which is more likely to cause a warping problem on the pressure sensor. In contrast, the third embodiment and the fourth embodiment using PDMS as the soft films did not show a decrease and then an increase in voltage change.

In addition, based on the results in FIG. 8 and Table 3, the relative relationship between the voltage change obtained by the pressure sensor and the pressure on the pressure sensor changes regardless of changing the material of the soft film or the width of the cavity of the elastomer. In other words, the material of the soft film or the width of the cavity of the elastomer may be changed according to actual needs.

Figure 9:
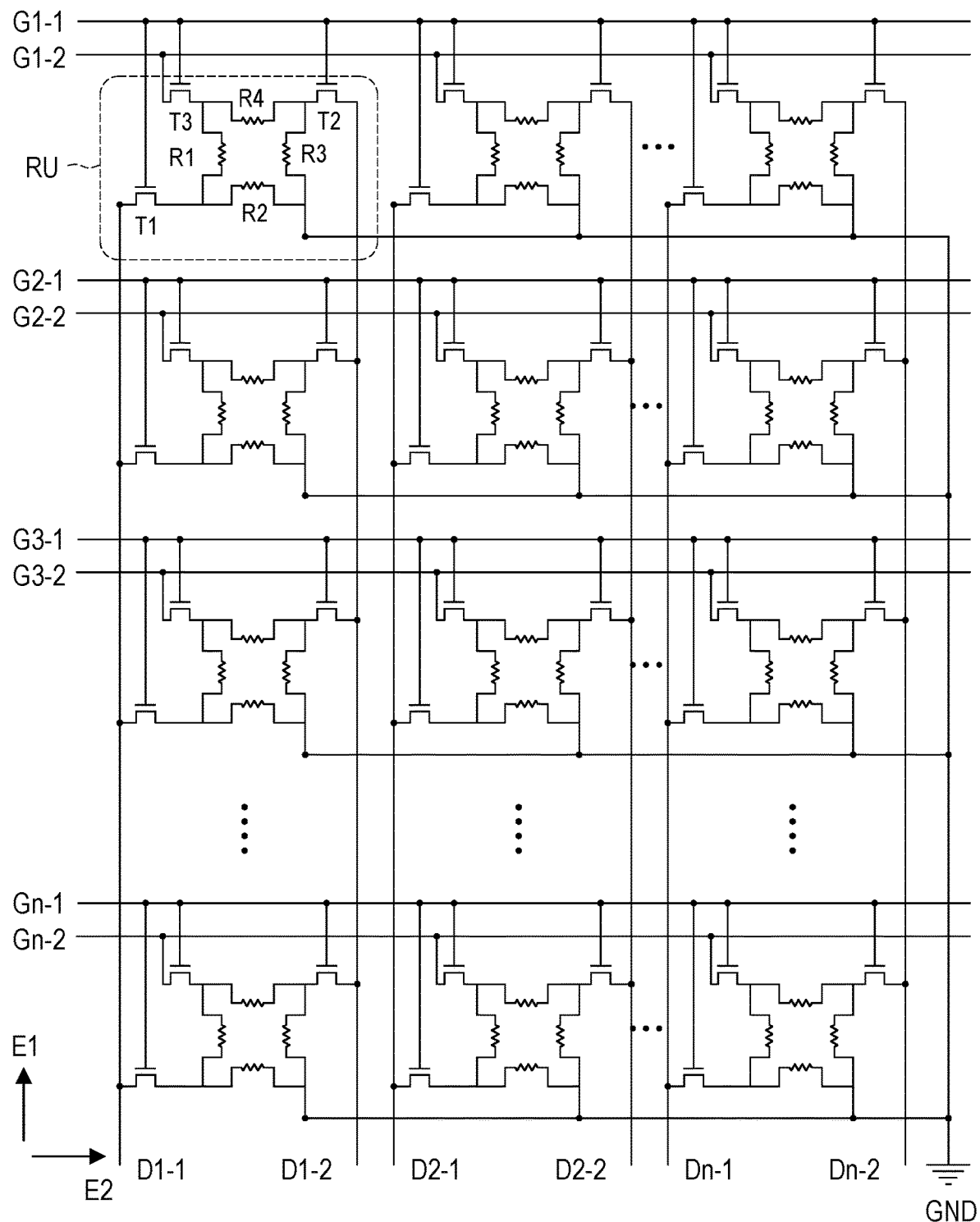
FIG. 9 is a schematic view of a circuit of a pressure sensor according to an embodiment of the disclosure.

FIG. 9 is a schematic view of a circuit of a pressure sensor according to an embodiment of the disclosure. It is noted here that the embodiment of FIG. 9 uses the reference numerals and a part of the contents of the embodiment of FIG. 6, and the same or similar reference numerals are used to denote the same or similar elements, and the description of the same technical content is omitted. For the description of the omitted part, reference may be made to the foregoing embodiment, and details are not described herein.

Referring to FIG. 9, in this embodiment, each of the pressure sensing elements RU further includes a third switch component T3. The first signal lines G1-2~Gn-2 are electrically connected between the first resistor R1 and the fourth resistor R4 through the third switch component T3. The gate of the first switch component T1, the gate of the second switch component T2, and the gate of the third switch component T3 in a single pressure sensing element RU are electrically connected to each other through a corresponding gate signal line G1-1~Gn-1.

In this embodiment, multiple gate signal lines G1-1~Gn-1 and multiple first signal lines G1-2~Gn-2 are electrically connected to corresponding pressure sensing elements RU, respectively. For example, the first row of the pressure sensing elements RU is electrically connected to the gate signal line G1-1 and the first signal line G1-2; the second row of the pressure sensing elements RU is electrically connected to the gate signal line G2-1 and the first signal line G2-2; and the nth row of pressure sensing elements RU is electrically connected to the gate signal line Gn-1 and the first signal line Gn-2.

In this embodiment, the performance of the pressure sensor is improved by the configuration of the third switch component T3. Specifically, by configuring the third switch component T3, in response to the third switch component T3 not being turned on, the electric current does not pass through the pressure sensing element RU, thereby reducing the power consumption and heat generation of the pressure sensor and improving the safety of the pressure sensor for portable apparatus and medical apparatus.

Figure 10:
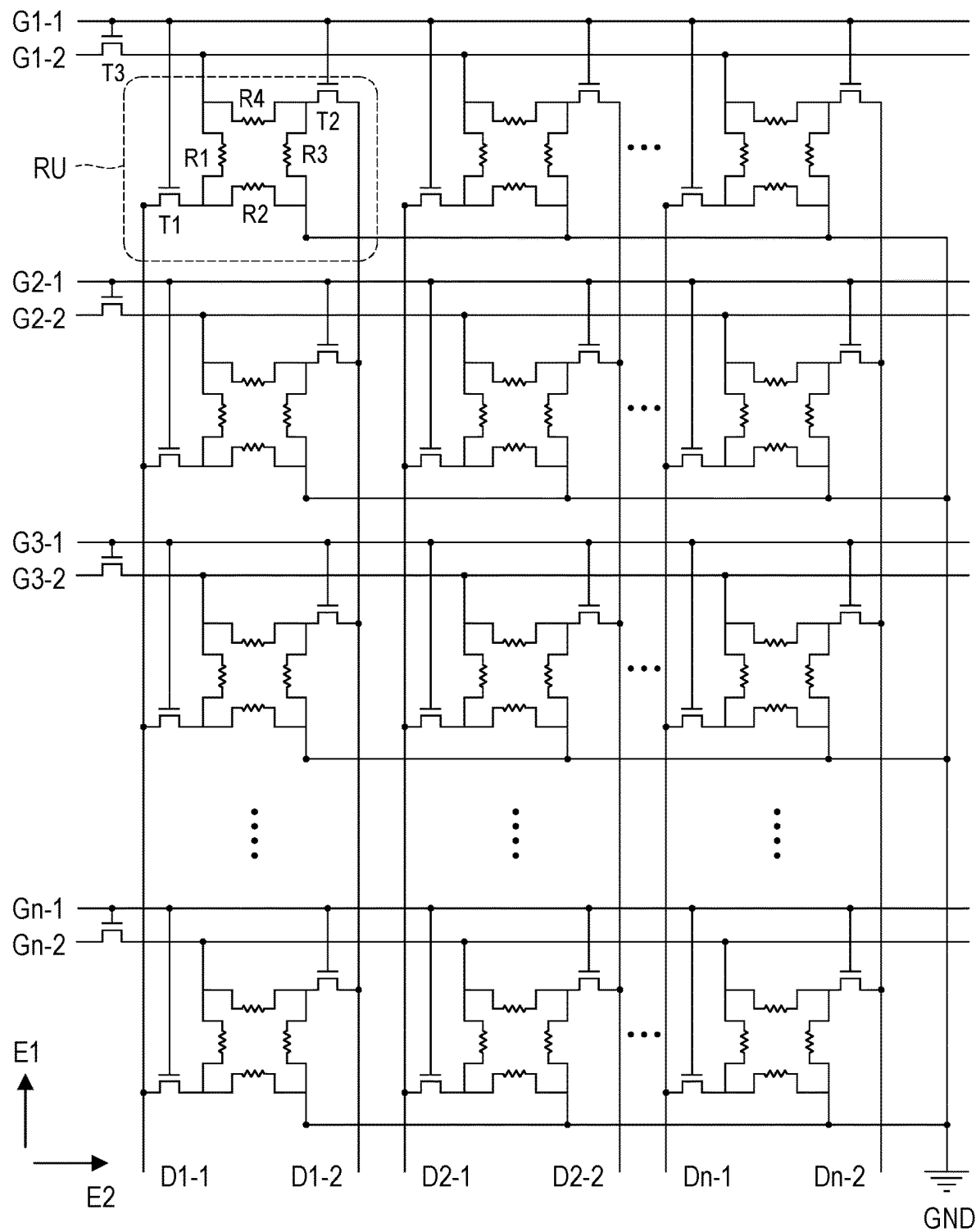
FIG. 10 is a schematic view of a circuit of a pressure sensor according to an embodiment of the disclosure.

FIG. 10 is a schematic view of a circuit of a pressure sensor according to an embodiment of the disclosure. It is noted here that the embodiment of FIG. 10 uses the reference numerals and a part of the contents of the embodiment of FIG. 9, and the same or similar reference numerals are used to denote the same or similar elements, and the description of the same technical content is omitted. For the description of the omitted part, reference may be made to the foregoing embodiment, and details are not described herein.

In the embodiment of FIG. 9, each of the pressure sensing elements RU includes a third switch component T3, and each of the first signal lines G1-2~Gn-2 is electrically connected to the third switch components T3. However, in the embodiment of FIG. 10, each of the first signal lines G1-2~Gn-2 is electrically connected to the pressure sensing elements RU through one third switch component T3.

Referring to FIG. 10, the gates of the first switch components T1 and the gates of the second switch components T2 in the pressure sensing elements RU in the same row are electrically connected to one corresponding third switch component T3 through a corresponding gate signal line G1-1~Gn-1.

In this embodiment, the performance of the pressure sensor is improved by the configuration of the third switch component T3. Specifically, by configuring the third switch component T3, in response to the third switch component T3 not being turned on, the electric current does not pass through the pressure sensing element RU, thereby reducing the power consumption and heat generation of the pressure sensor and improving the safety of the pressure sensor for portable apparatus and medical apparatus.

What is claimed is:

1. A pressure sensor, comprising:
a substrate;
a pressure sensing element, located on the substrate, wherein the pressure sensing element comprises:
a first resistor and a second resistor connected in series;
a third resistor and a fourth resistor connected in series, wherein the first resistor and the second resistor are connected in parallel to the third resistor and the fourth resistor;
a first switch component, electrically connected between the first resistor and the second resistor; and a second switch component, electrically connected between the third resistor and the fourth resistor;
a first signal line, electrically connected between the first resistor and the fourth resistor;
a second signal line, electrically connected between the second resistor and the third resistor;
an elastomer, located on the substrate and comprising a cavity, wherein the first resistor, the second resistor, the third resistor, and the fourth resistor at least partially overlap with the cavity; and
an opposite substrate, located on the elastomer.

2. The pressure sensor according to claim 1, wherein materials of the first resistor, the second resistor, the third resistor, and the fourth resistor comprise polycrystalline silicon.

3. The pressure sensor according to claim 1, further comprising:
a soft film, wherein the substrate is located between the pressure sensing element and the soft film.

4. The pressure sensor according to claim 1, wherein a hardness of the opposite substrate is greater than a hardness of the substrate.

5. The pressure sensor according to claim 1, further comprising:
a gate signal line, electrically connected to a gate of the first switch component and a gate of the second switch component.

6. The pressure sensor according to claim 1, further comprising:
a third switch component, wherein the first signal line is electrically connected between the first resistor and the fourth resistor through the third switch component.

7. The pressure sensor according to claim 6, wherein a gate of the first switch component, a gate of the second switch component, and a gate of the third switch component are electrically connected to each other.

8. The pressure sensor according to claim 1, further comprising:
a plurality of pressure sensing elements, located on the substrate;
a gate signal line, electrically connected to a gate of the first switch component and a gate of the second switch component in the pressure sensing elements;
a third switch component, wherein the first signal line is electrically connected to the pressure sensing elements through the third switch component, and a gate of the third switch component is electrically connected to the gate signal line.

9. The pressure sensor according to claim 1, further comprising:
a plurality of pressure sensing elements, located on the substrate, wherein the elastomer comprises a plurality of cavities, and each of the cavities overlaps with corresponding one of the pressure sensing elements.

10. The pressure sensor according to claim 1, wherein types of a side wall of the cavity comprises step type, slope type, or vertical type.

11. The pressure sensor according to claim 1, wherein the first resistor, the second resistor, the third resistor, and the fourth resistor partially overlap with an edge of the cavity.

12. The pressure sensor according to claim 1, further comprising:
a first signal sensing line, electrically connected to the first resistor and the second resistor through the first switch component; and
a second signal sensing line, electrically connected to the third resistor and the fourth resistor through the second switch component.

13. The pressure sensor according to claim 1, further comprising:
a plurality of first signal lines and a plurality of gate signal lines; and
a plurality of pressure sensing elements, arranged in an array along a first direction and a second direction, wherein:
gates of first switch components and gates of second switch components of the pressure sensing elements in a same row in the second direction are electrically connected to a corresponding gate signal line, and the pressure sensing elements in the same row in the second direction are electrically connected to a corresponding first signal line.

14. The pressure sensor according to claim 1, further comprising:
a plurality of first signal sensing lines and a plurality of second signal sensing lines, wherein first switch components of pressure sensing elements in a same column in a first direction are electrically connected to a corresponding first signal sensing line, and second switch components of the pressure sensing elements in the same column in the first direction are electrically connected to a corresponding second signal sensing line.

* * * * *